No. 711,008. Patented Oct. 14, 1902.
A. A. SCOTT.
ELEVATING TRUCK.
(Application filed Mar. 8, 1902.)
(No Model.)
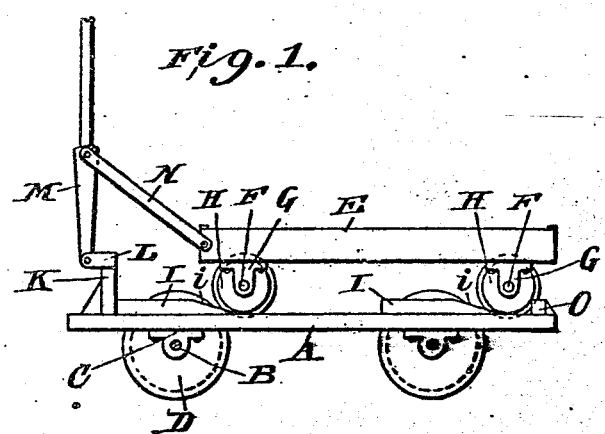
Fig. 1.
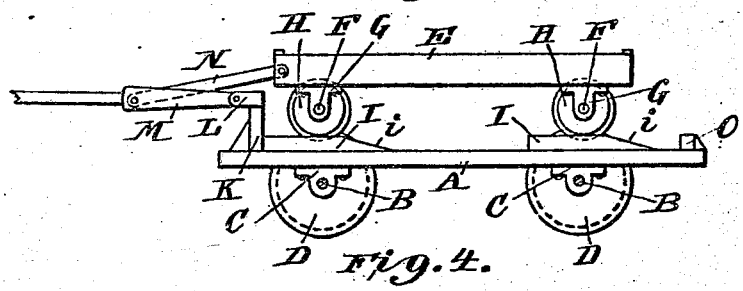
Fig. 2.
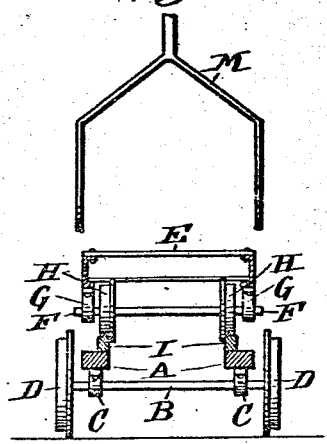
Fig. 3.
Fig. 4.
Witnesses
Jas H Blackwood
C Randolph Jr.
Inventor
Alexander A. Scott
by D. A. Gourick
Attorney

UNITED STATES PATENT OFFICE.

ALEXANDER ANDERSON SCOTT, OF KNOXVILLE, TENNESSEE.

ELEVATING-TRUCK.

SPECIFICATION forming part of Letters Patent No. 711,008, dated October 14, 1902.

Application filed March 8, 1902. Serial No. 97,384. (No model.)

*To all whom it may concern:*

Be it known that I, ALEXANDER ANDERSON SCOTT, a citizen of the United States, residing in the city of Knoxville, in the county of Knox and State of Tennessee, have invented certain new and useful Improvements in Elevating-Trucks, of which the following is a specification.

My invention relates to trucks for carrying heavy loads, such as pallets of molded brick, &c., and has for its object to provide a device that will reduce to a minimum the friction incident to raising and lowering the platform.

The construction of my invention is fully disclosed in the drawings, in which—

Figure 1 is a side view in elevation of my invention, showing the platform lowered for receiving the load; Fig. 2, a like view showing the platform in an elevated position; Fig. 3, a front view, and Fig. 4 a detail view, of the operating lever or handle.

Referring to the drawings, in which similar reference characters indicate corresponding parts throughout the several views, A represents the base-frame of my truck, B the axles journaled in the brackets C, and D the wheels keyed to said axles.

E represents the platform, which is in reality a frame of another truck, having axles F, journaled in brackets G, and wheels H, keyed to said axles. The wheels H are preferably flanged, and the tread is intended to travel in the side beams of the base-frame A and on the blocks I, secured to said side beams having inclined surfaces *i*, up which the wheels H are adapted to travel to raise the platform E.

K represents standards at the front of the base-frame, having ears L secured thereto, between each pair of which are pivoted one of the arms of the Y-shaped handle or lever M, and N links, pivotally connecting the handle M with the front of the platform E.

O represents stops at the rear of the base-frame A to limit the backward movement of the upper truck or elevating-platform.

It will be readily understood that when wheels H of the upper truck are resting on the side beams of the frame A the platform E is in a lowered position and may be run under its load, the handle M being in a raised position. The handle is then depressed, pulling forward the upper truck, the wheels of which travel up the incline *i* and rest on the top of the blocks I when the platform E is in an elevated position and the load raised thereon. When the destination has been reached, the handle M is raised, thus forcing the upper truck back down the incline *i*, and the wheels H come to rest on the base A, the load meanwhile being deposited on suitable trestles or frames, and the truck may be removed and is ready to repeat the above operation.

Having thus described my invention, what I claim is—

1. In an elevating-truck, side beams having wheels journaled thereon forming the running-gear of the truck, blocks secured to the upper side of said side beams each block having a rearwardly-extending inclined surface, an elevating-platform comprising a wheeled truck adapted to travel on said side beams and blocks, and means to actuate said platform-truck, substantially as shown and described.

2. In an elevating-truck, a base-frame, blocks secured on said base-frame having inclined surfaces toward the rear of the truck, a platform, wheels journaled to said platform to ride on the side beams of said base-frame and said blocks, uprights at the front of said base-frame, a U-shaped handle pivoted to said uprights, links connecting said handle with the front of the platform, and stops at the rear of the base-frame to limit the backward movement of said wheeled platform, substantially as shown and described.

3. An elevating-truck consisting of a base-frame, brackets secured thereon, wheels journaled in said brackets, blocks secured to the side beams of said base-frame having rearwardly-inclined surfaces, uprights secured the front of said base-beams, ears secure said uprights, a V-shaped handle journaled in said ears, an elevating-platform having brackets secured to the side beams thereof, wheels journaled in said brackets adapted to travel on the side beams of the base-frame and the blocks secured thereto, links connecting the front of said platform with said V-shaped handle, and stops at the rear of the base-frame side beams, substantially as shown and described.

In testimony whereof I hereto affix my signature in the presence of two witnesses.

ALEXANDER ANDERSON SCOTT.

Witnesses:
 ADOLPH SCHMID,
 L. S. STEELE.